April 10, 1962 L. C. COTTS 3,029,332
ELECTRIC SPACE HEATING FURNACE
Filed Sept. 28, 1959 2 Sheets-Sheet 1
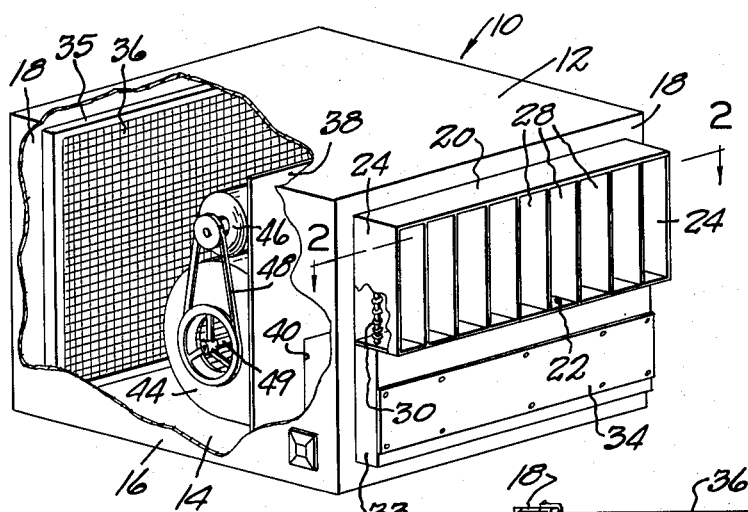
INVENTOR.
LOUIS C. COTTS
ATTORNEY April 10, 1962 — L. C. COTTS — 3,029,332
ELECTRIC SPACE HEATING FURNACE
Filed Sept. 28, 1959 — 2 Sheets-Sheet 2
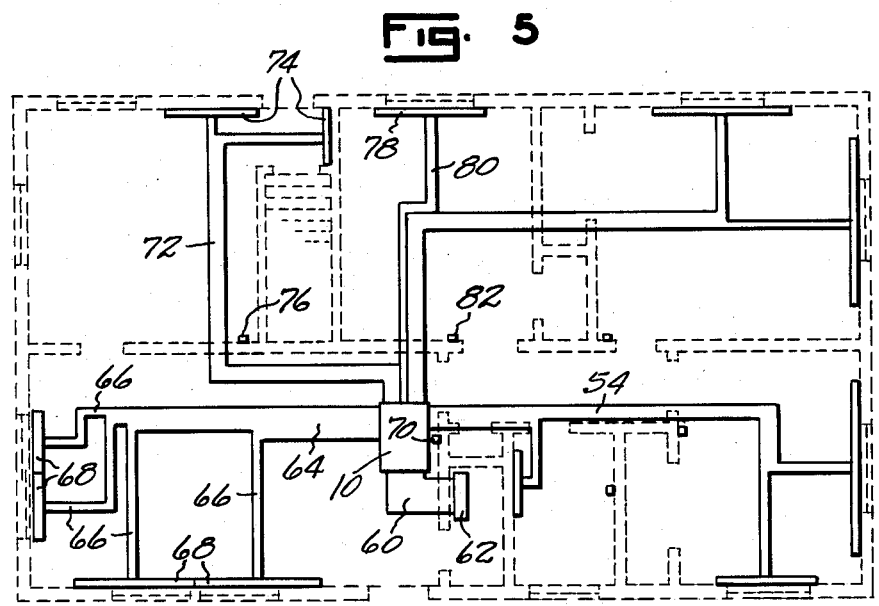
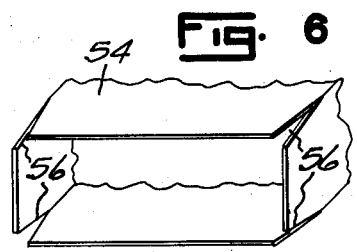
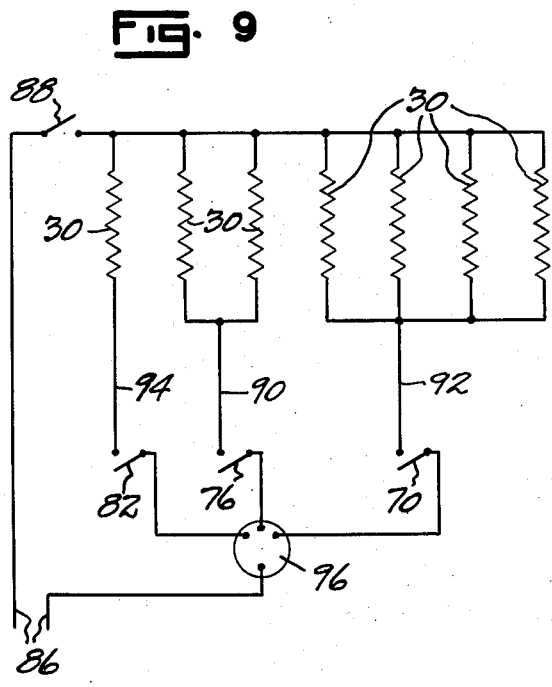
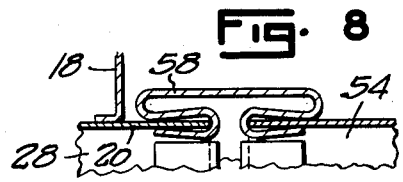
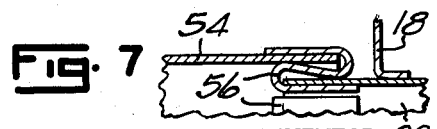
INVENTOR.
LOUIS C. COTTS
BY Eugene C. Knoblock
ATTORNEY _United States Patent Office_ 3,029,332
Patented Apr. 10, 1962

3,029,332
ELECTRIC SPACE HEATING FURNACE
Louis C. Cotts, 2512 Oak St., Michigan City, Ind.
Filed Sept. 28, 1959, Ser. No. 843,008
17 Claims. (Cl. 219—39)

This invention relates to electric space heating furnaces, and more particularly to a warm air heating furnace.

Warm air electric space heating furnaces have been designed heretofore with a plenum chamber containing electric heating elements located to be impinged upon by air passing through the chamber from a cold air return line to a heating duct. Such units operate in response to a single thermostat located in the space to be heated. The response to a single thermostat sacrifices flexibility of the device because there is no control possible to differentiate the rate at which heated air is supplied to different zones of the building. Lack of such flexibility entails sacrifice of economy since it may entail overheating certain zones in the event the thermostat is located in a zone requiring more heat than others, or may entail sacrifice of comfort in the event the thermostat is located in a zone requiring less heat than other zones in the space to be heated.

Control of heat by zones is possible by the use of a system positioning electric heating elements in heat outlets as shown in Cotts and Brenner Pat. No. 2,839,659, dated June 17, 1958. Such systems overcome the disadvantages of systems wherein the heating elements are located in a central plenum chamber but have the disadvantage of high cost in cases where each outlet has a thermostat incorporated in it, because of the expense of the wiring required for the system.

The primary object of this invention is to overcome the disadvantages of the prior systems and to provide the benefits of zone control, coupled with a central heating unit which minimizes the cost of wiring and installation.

A further object is to provide a device of this character having a housing defining a plenum chamber provided with a plurality of outlet passages, each mounting a heating element for heating air passing therethrough as it flows to a discharge duct and an air distributor in a zone to be heated.

A further object is to provide a device of this character having a housing defining a plenum chamber in which are arranged a number of outlets positioned side by side and each of a selected dimension in cross-section and each mounting a heating element, wherein a duct of a cross-sectional size substantially equal to a multiple of the cross-sectional size of each individual passage is connected to a number of said passages to accommodate flow of heated air therethrough at a selected flow rate and subjected to a heating effect proportional to the cross-sectional area of the duct.

A further object is to provide a device of this character wherein a casing defining a plenum chamber has a plurality of outlet passages therein connected with ducts leading to different zones in a space to be heated and of cross-sectional sizes proportioned to the requirements for heat in each zone, wherein electric heating elements are located in said passages and the heating elements for heating the air discharging to each duct are responsive to a thermostat located in the zone to which the duct discharges.

A further object is to provide a device of this character wherein a selected relation between the air flow capacity of a duct and the electrical wattage of the heating element for heating the air flowing through said duct is maintained.

A further object is to provide a simple and economical device of this character making it possible to combine a heating and an air-conditioning system to control the humidity of the air, to filter the air, and to provide ventilation in a zone-controlled electrically energized unit.

Other objects will be apparent from the following specification.

In the drawing:

FIG. 1 is a perspective view of one embodiment of the invention, with parts broken away;

FIG. 2 is a horizontal sectional view of the device taken on line 2—2 of FIG. 1, with modifications;

FIG. 3 is a vertical sectional detail view of the device taken on line 3—3 of FIG. 2;

FIG. 4 is a vertical sectional detail view of the device taken on line 4—4 of FIG. 3, with modifications;

FIG. 5 is a view illustrating an application of the device in a warm air heating system of a building having multiple rooms;

FIG. 6 is a fragmentary perspective view illustrating the end of a duct adapted for connection to an outlet passage of the furnace;

FIG. 7 is an enlarged fragmentary detail sectional view illustrating one type of connection between a furnace outlet passage and a duct;

FIG. 8 is an enlarged fragmentary detail sectional view illustrating another type of connection between a furnace outlet passage and a duct; and FIG. 9 is an illustrative wiring diagram.

Referring to the drawings which illustrate the preferred embodiment of the invention, the numeral 10 designates a casing or housing which preferably has a top wall 12, bottom wall 14, side walls 16 and end walls 18, each preferably of rectangular form as shown and of any selected size and dimension. The unit may be provided with any suitable means (not shown) for supporting the same at selected position, such as means suspending the same from an overhead support.

The casing 10 is provided with a plurality of outlet-passage-defining parts adjacent one end portion thereof. In the form shown in FIGS. 1, 3 and 4, the outlet portion extends through an elongated opening in a wall, such as an end wall 18, and consists of a top plate 20, bottom plate 22, and end plates 24, each preferably extending through the wall 18 so that a portion thereof projects outwardly from said wall, as seen in FIG. 1, and a portion thereof projects inwardly into the casing 10, as seen in FIG. 4. If desired, the bottom may be of stepped construction, as illustrated in FIG. 4, with the interior portion 26 of the end plate flared or enlarged. A plurality of parallel partition plates 28 divide the passage into a plurality of passages preferably of substantially the same cross-sectional area, as seen in FIG. 1. Each of these passages is preferably rectangular and of the same dimensions as the others, and each is open at both ends thereof, that is, at its inner and its outer end.

Each passage mounts an electric heating element 30, such s a Calrod unit or other insulated electrical resistance member. In cases where the passage has a flared portion 26 provided by a stepped bottom, as seen in FIG. 4, the heating element will preferably be located at said stepped portion to accommodate a size of element larger than could be accommodated if the passage were of uniform cross-sectional area throughout its length. It will be understood, however, that the electric heating element 30 may be mounted within the passage exteriorly of the casing 10, as illustrated in FIGS. 1 and 2. Such mounting of the heating element 30 makes possible the provision of tubular outlet passages 32 projecting outwardly only from the casing, as shown in FIG. 2. It will also be understood that the grouping of a plurality of passages side by side, separated only by partitions 28, as shown in FIG. 1, is not required and that, instead, individual spaced outlet-passage-forming tubes 32 may be provided. FIG. 2 also illustrates the positioning of outlet-passage-forming members 32 in a plurality of angularly disposed walls of the casing 10.

The casing 10 will preferably have mounted on one or more walls thereof, such as wall 18, adjacent to the outlet passages, an enclosure 33 preferably having a removable closure plate 34 which serves to house an electric wiring panel (not shown) with which leads to the respective heating elements 30, and to other elements of an operating circuit to be described, are connected. It will be understood that the electrical components, such as the elements 30, will be suitably electrically insulated from the casing 10 and the outlet passage members in which the electrical heating elements are mounted. It will also be understood that the mounting of the heating elements preferably will be such as to facilitate rapid and easy disconnection of each individual heating element from the casement for purposes of replacement or repair.

The casing 10 will have an air inlet opening for supplying air to the plenum chamber defined thereby, and this may be connected to an air return line or to a line leading to the exterior of the space to be heated, or to both, and suitable means will be provided for effecting forced circulation of air through the inlet and plenum chamber to the discharge passages. The casing may constitute a self-contained unit, as illustrated in FIGS. 1 and 2, or may constitute an attachment unit adapted to be connected to the outlet of a space heater of any selected type, or to be connected to an air-conditioning or cooling unit for the space to be heated. In the event the unit is an attachment, the casing need not include air-circulating means or filters or humidifiers or cooling coils, if such are provided in the equipment to which the unit is attached.

In the self-contained or unitary device selected for illustration, one end of the casing remote from the end from which the outlet passages extend is provided with an opening adapted for communication with an air return line. Means 34 carried by the casing surrounding the inlet opening serve to detachably mount a filter 36 of any usual character. A partition 38 spans the casing 10 intermediate the length thereof and between the inlet and outlets and is apertured at 40 to communicate with the discharge duct 42 of a fan or blower of any suitable character having a conventional drive motor 46 and drive transmission means 48 between the motor and the fan rotor 49. The drive transmission means is here illustrated as being of the belt and pulley type.

In the unitary construction illustrated, a humidifier 50 may be mounted in the casing 10, preferably between the end wall mounting the filter 36 and the fan-mounting partition 38. The humidifier 50 may be of any type suited for use in a cold air return line, such as a unit of the character having an electric heater (not shown) immersed in water to vaporize the water so that the air entering the fan 44 from the inlet will be humidified. Alternatively, a humidifier of the spinner type may be used, wherein a motor driven rotor impinges against liquid in a humidifier housing to create a spray which is picked up by air flowing therepast. Both of the above described types of humidifiers are well known in the art and hence further and detailed illustration and description thereof is believed to be unnecessary.

The unitary construction may also include an air cooling coil 52 positioned between the air inlet and the blower 44, which coil 52 will have connection with a compressor and other components of an air cooling or refrigerating system (not shown), as well understood in the art.

The usual hot air ducts 54 are connected to the outlet passages of the furnace casing 10, and for this purpose will preferably be notched at one end thereof at 56 lengthwise of the corners thereof when the ducts are intended for connection to outlet passages of the character illustrated in FIG. 1. The notches 56 permit the end of the duct 54 to fit around or within a selected number of outlet passages, with the notches each receiving therein one of the parts 20, 22 or 28 incident to such interfitting relation of duct and outlet-passage-forming structure. The ducts 54 used with the construction illustrated in FIG. 1 will preferably have one cross-sectional dimension thereof substantially equal to the spacing between the members 20 and 22 at portions thereof extending exteriorly of the casing. The other transverse dimension of each duct 54 will be substantially equal to the spacing between adjacent passage-separating members 28 or some multiple of that spacing. In this connection I contemplate that in one embodiment the vertical dimension of the members 24 and 28 shown in FIG. 1 may be substantially eight inches and that the passage-separating members 28 may be spaced apart substantially two inches from each other and from the members 24. The ducts 54 used with such an embodiment will preferably have one transverse dimension of substantially eight inches or slightly more, and a second transverse dimension of two inches or some multiple of two inches. Thus a conduit having a dimension of eight inches by four inches in cross-section would serve to communicate with two of the passages in the FIG. 1 construction, and a conduit having a dimension substantially eight inches by eight inches in cross-section would communicate with four of the outlet passages shown in FIG. 1.

The ducts 54 may be connected to the outlet-passage-forming parts by any suitable means. Thus, in FIG. 7, I have illustrated an S-shaped clip 56 usable to interconnect the adjacent walls of an interfitting duct 54 and passage-defining structure at a telescoping joint. Each of the clips 56 will be of a length to extend substantially across one wall of the duct. If necessary, notches (not shown) may be formed in the partitions 28 to receive the clips in cases where the width of the duct wall is a multiple of the spacing between said partitions. Another clip construction for connecting a conduit 54 with a passage defining structure is illustrated in FIG. 8 and accommodates connection of units which are of substantially the same dimension with a substantially butt fit, said clips in effect constituting a double S clip 58.

FIG. 5 illustrates a typical installation of the furnace in a residence. Casing 10 is mounted centrally in the residence, or centrally in a section or portion of a residence to be served thereby, either in a basement or in a utility room in a house built upon a slab. A duct 60 communicates with an air intake of the casing and extends to one or more cold air returns 62 or to cold air return means and an outdoor air supply means. A duct 64 extends from casing 10 to branch conduits 66, each leading to one of a plurality of air distributors 68 located in one zone or room. Thus a large room, such as a living room, may be provided with a volume of heated air flow proportional to its dimension. A thermostat 70 will preferably be located in the room or zone serviced by the duct 64. Smaller rooms or zones may be serviced by smaller ducts. Thus a duct 72 services two distributors 74 located in a room containing a control thermostat 76. In another small room a distributor 78 is serviced by a small duct 80 and is controlled by a thermostat 82. In this example, the duct 80 may be of substantially the same cross-sectional size as one of the outlet passages in the FIG. 1 construction; the duct 72 may be of a cross-sectional size substantially equal to that of two adjacent outlet passages in the FIG. 1 construction; and the duct 64 may be of a cross-sectional size substantially equal to that of appoximately four adjacent outlet passages. These size relations are cited by way of example and are not intended to be limiting inasmuch as it will be obvious that the ducts employed may be of cross-sectional sizes substantially equal to any multiple of the cross-sectional size of a single air passage in the FIG. 1 construction.

FIG. 9 illustrates a typical wiring diagram in which supply line 86 has the heating elements 30 of the furnace connected thereto in parallel relation. A switch 88 responsive to air pressure or velocity is interposed in the circuit. The switch 88 is so located, preferably in the furnace, as to respond to air flow in the heating system, and serves to deenergize the circuit in the event air does not flow therepast at a predetermined velocity. This constitutes a safety factor deenergizing the furnace in the event the blower 44 should be deenergized. The heating elements are associated with thermostats. Thus the heating element 30 in the passage communicating with a small duct 80 is controlled by thermostat 82; the heating elements 30 in the several furnace outlet passages communicating with the duct 72 are connected in parallel by a lead 90 having thermostat 76 interposed therein; and the heating elements 30 in the several furnace outlet passages communicating with the duct 74 are connected in parallel by a lead 92 having thermostat 70 interposed therein. Each of the leads 90 and 92, and the lead 94 in which the thermostat 82 is interposed, preferably extend to a load-limiting switch 96 of a character well known in the art and serving to prevent simultaneous energization of a plurality of circuits connected thereto. The purpose of the switch 96 is to energize the various circuits connected thereto serially or successively in the event that the controls thereof, such as thermostats 70, 76 and 82, should simultaneously close. Inasmuch as switches of this character are well understood in the art, further description and illustration thereof is not believed necessary.

The furnace may have any selected number of outlets provided therein according to its intended use, or may be a unit of standard size with a number of outlets equal to or greater than those required for servicing the area to be heated. In the event of use of a standard unit having more outlets than are required, it will be evident that cap means or closures (not shown) may be mounted to span the outlet passages which are not required in use.

It will be apparent that my device provides for zone control of flow of heated air according to the requirements of the different zones which are served, as determined by a single thermostat located in each such zone. Use of a single thermostat in each zone, as distinguished from the use of a thermostat at each air distributing outlet at each zone, and the location of heating elements at each outlet of the funace casing greatly reduces the cost of wiring or installation of this furnace. At the same time the furnace makes possible the use of a number of electric heating elements of small capacity or low wattage rather than one or more of the high wattage heating units usually required when the air in the plenum chamber is to be heated. Furthermore, the system insures that the heating capacity for heating air passing through each duct leading from the furnace casing has a predetermined direct relation to the cross-sectional dimension of that duct, so that the heating efficiency of the heated air passing to each zone of the building is substantially equal to the efficiency at all other zones.

The zone control produces uniform heating of all zones or rooms of a building and avoids variation in heating results either by overheating or underheating in some zones or rooms. The assurance that no rooms will be overheated is important to maintain heating costs at a minimum. In this connection it will be apparent that the present unit takes advantage of other heat sources in each individual room or zone, such as heat generated by lighting equipment, kitchen appliances, hot water shower baths, sun or solar heating, or heat resulting from any other source, such as a temperature rise resulting by the congregation of a number of people in a single room. The zone control made possible by this system also takes into account conditions which might tend to cool some zones of a building more than others. Thus zones or rooms of a building located at the side of the building which is exposed to high winds are provided with heated air in a quantity necessary to make such zones comfortable without causing overheating of zones of the building not so exposed to the wind.

In event this furnace is used in conjunction with or as an attachment to a primary heat source, such as a furnace of the type having a single heat source, so that air enters the plenum chamber of this furnace in a heated condition, it will be apparent that this furnace makes possible zone control by limiting the operation of the electrical heating elements thereof to respond only to demands for heat in each zone exceeding that normally supplied from the primary heat source to which this furnace is attached.

Another advantage of the device is that it may constitute an attachment to or may constitute a unit having integrated therewith an air cooler or air conditioner. In such cases a single system of ducts in a building serves to function both for heating and cooling purposes. In such a unit or assembly, as in each other installation of the furnace, the advantages of room ventilation and air circulation, coupled with either humidification or dehumidification of the circulated air, is made possible.

The furnace may also include the use of a limit control 100 associated with each electric heating element 30 and serving to prevent overheating of any portion of the furnace or of any duct or ducts in the event of failure of operation of a thermostatic control, failure of adequate air flow through a given duct, or any other adverse occurrence.

While it is contemplated that in most instances all furnace outlet-defining passages will be of substantially the same dimension and will have located therein heating elements of substantially the same wattage, this is not essential. Thus, it will be observed in FIG. 2 that some of the outlet passages 32′ may have a larger cross-sectional size than other outlet passages 32, and the heating elements 30′ in the large cross-section outlets 32′ may be of larger size or have a higher wattage than the heating elements 30 in the smaller passages 32. In each instance a selected relation between the air flow capacity of a passage and the electrical wattage of the heating element in that passage will preferably be maintained.

While the heating elements have been illustrated herein as being located within outlet-passage-defining portions of the casing, it will be understood that this arrangement is not critical and that any location of a heating element, as within casing 10 and adjacent the mouth of a passage by which the air entering a selected passage is heated by a selected element, may be employed.

While the preferred embodiment of the invention has been illustrated and described, it will be understood that changes in the construction may be made within the scope of the appended claims without departing from the spirit of the invention.

I claim:

1. An electric space heating furnace comprising a casing defining a plenum chamber and having a plurality of juxtaposed rectangular outlets, an open ended tubular structure carried by and outlining each outlet, a plurality of rectangular ducts each duct being connected to a selected number of said tubular structures, means in said chamber for discharging air to and through said tubular structures and ducts, a plurality of electric heating elements, means supporting each element to heat air flowing through a selected tubular structure, means for energizing said heating elements selectively, and means responsive to air flow in said tubular structure for controlling the heating element.

2. An air heating apparatus comprising a casing having an air inlet adapted for connection to a forced air circulating device and an air outlet, a plurality of parallel partitions dividing said casing outlet into a plurality of passages of rectangular cross-section, an electric heating element mounted in each passage, means selectively controlling said heating elements, and a plurality of ducts of rectangular cross-section connected at said outlet, each duct being connected with said casing and at least one partition for communication with a selected number of passages, all ducts being supplied with air from a common air circulating device at said casing inlet.

3. An air heating apparatus comprising a casing having an air inlet adapted for connection to a forced air circulating device and an air outlet, a plurality of parallel partitions dividing said casing outlet into a plurality of passages of rectangular cross-section, an electric heating element mounted in each passage, a plurality of ducts of rectangular cross-section discharging to different spaces to be heated and each connected at said outlet with said casing and at least one partition, and means responsive to the heating requirements of said spaces for selectively controlling the heating elements associated with the respective ducts, all ducts being supplied with air from a common air circulating device at said casing inlet.

4. An electric space heating furnace comprising a casing defining a plenum chamber and having means defining a plurality of open-ended air discharge passages arranged side by side, an electric heating element mounted in each discharge passage, each discharge passage having one end portion of larger cross-sectional dimension than the other end portion, said heating elements being mounted in said large end portions, and air circulating means in said casing for directing air to and through said discharge passages.

5. An electric space heating furnace comprising a casing defining a plenum chamber and having means constituting a plurality of juxtaposed open-ended tubular air discharge passages and an electric heating element mounted in each tubular discharge passage, each tubular discharge passage being defined in part by opposed walls of which one flares at the end thereof in said casing, said opposed walls being interconnected throughout their length by intervening walls, said heating elements being located in each tubular discharge passage adjacent said flaring wall end portions.

6. An electric space heating furnace comprising a casing defining a plenum chamber and having a rectangular discharge opening, a tubular structure carried by said casing outlining and extending through said opening, a plurality of spaced parallel partitions mounted in said tubular structure and dividing the same into a plurality of outlet passages open at their ends, and an electric heating element mounted in each outlet passage.

7. An electric space heating furnace comprising a casing defining a plenum chamber and having a rectangular discharge opening, a tubular structure carried by said casing outlining and extending through said opening, a plurality of equispaced parallel partitions mounted in said tubular structure and dividing the same into a plurality of juxtaposed outlet passages of similar rectangular cross-section open at their ends, and an electric heating element mounted in each outlet passage.

8. An electric space heating furnace comprising a casing defining a plenum chamber and having a rectangular discharge opening, a tubular structure carried by said casing and outlining said opening, a plurality of equispaced parallel partitions mounted in said tubular structure and dividing the same into a plurality of juxtaposed passages of similar rectangular cross-section open at their ends, and an electric heating element mounted in each passage, a plurality of ducts, each duct having a rectangular cross-section and communicating with a selected number of said passages, and means connecting each duct to said tubular structure and at least one of said partitions.

9. An electric space heating furnace comprising a casing defining a plenum chamber and having a rectangular outlet opening, a tubular structure carried by said casing and outlining said outlet opening, a plurality of equispaced parallel partitions mounted in said tubular structure and dividing the same into a plurality of juxtaposed passages of similar rectangular cross-section open at their ends, and an electric heating element mounted in each passage, a plurality of ducts of rectangular cross-section and means connecting each duct to a selected portion of said tubular structure and to at least one of said partitions for communication with a selected number of said passages, each duct having a cross-sectional dimension substantially equal to the sum of the cross-sectional areas of the passages communicating therewith.

10. An electric space heating furnace comprising a casing defining a plenum chamber and having a discharge opening, an open-ended tubular passage-defining structure carried by said casing in said discharge opening, partitions dividing said tubular structure into a plurality of passages, a plurality of ducts, each duct being connected to a part of said tubular structure and to a partition, means for discharging air from said chamber through said passages and ducts, electric heating elements, at least one element being mounted in each passage, means for energizing each of said heating elements selectively, and air-flow-responsive means carried by said tubular structure at each passage for controlling the heating element in the same passage.

11. A space heating furnace comprising a casing having two compartments, one compartment having an inlet, the other compartment constituting a plenum chamber and having discharge means constituting a plurality of juxtaposed open-ended rectangular tube structures, adjacent tube structures having a common wall, a plurality of rectangular ducts, each duct communicating with a selected number of tube structures, a blower in said first compartment discharging air into said second compartment, a plurality of electrical heating means in said casing, means positioning each heating means in the path of air flowing through only one of said tube structures, each heating means having a rated heat generating capacity having a predetermined relation to the cross-sectional area of the tube structure associated therewith, and means for energizing said heating means selectively.

12. An air heating apparatus comprising air supply means, a tubular structure mounted on said air supply means, said structure having an inlet adapted for connection to a forced air circulating device and an outlet, a plurality of parallel partitions dividing said structure into a plurality of juxtaposed passages adjacent said outlet, an electric heating element mounted in each passage, means selectively controlling said heating elements, and a plurality of ducts connected to said structure at said outlet, each duct having one transverse dimension substantially equal to the width of a passage and the other transverse dimension equal to the dimension of a selected number of passages, and means connecting each duct in communication with selected passages.

13. An air heating apparatus comprising an open-ended tubular structure, a plurality of parallel partitions dividing said tubular structure into a plurality of air passages of selected cross-sectional area, an electric heating element carried by said structure for heating air flowing in each air passage, means for selectively controlling each heating element, forced air circulating means connected to one end of said tubular structure for air discharges to all passages, and a plurality of ducts connected to the other end of said tubular structure, each duct being connected to receive heated air from a selected number of air passages.

14. An air heating apparatus comprising an open-ended tubular structure, a plurality of parallel partitions dividing said tubular structure into a plurality of air passages of similar cross-sectional area, forced air circulating means connected to one end of said tubular structure to cause air to flow equally through said air passages, separate electric heating elements operatively associated with each of said air passages, a plurality of ducts connected to the other end of said tubular structure, each duct being equal in cross-sectional area to the cross-sectional area of a selected number of said air passages, said ducts being adapted to convey air to spaces to be heated, and means for selectively operating said heating elements to supply heat in proportion to the requirements of the spaces to be heated and in proportion to the cross-sectional areas of the ducts connected to said respective spaces.

15. An electric heating apparatus comprising a multiplicity of contiguous rectangular open-ended air passage structures of similar cross-sectional area, an electric heating element carried by each of said structures for heating air flowing in each passage structure, a motor operated blower discharging into said passage structures substantially equal quantities of air to be heated by said heating elements, a plurality of ducts, each duct communicating with a selected number of passage structures, said ducts extending to different spaces to be heated, each duct being of a cross-sectional area proportional to the heating requirement of the space to which it is connected, and connected to a number of passage structures having heating elements capable of supplying the heating requirements of said space, and thermostatic means in each space to be heated controlling the heating elements for heating the air flowing through the ducts connected to said space.

16. A space heating furnace comprising a casing defining a plenum chamber and having a rectangular discharge opening, an open ended structure carried by said casing outlining and extending through said opening, a plurality of spaced parallel partitions mounted in said open ended structure and dividing the same into a plurality of outlet passages open at their ends, and in an air heating means mounted in each outlet passage.

17. An air heating apparatus comprising an open ended structure, a plurality of partitions dividing said open ended structure into a plurality of air passages of selected cross-sectional area, an air heating means carried by said structure for heating air flowing in each air passage, means for selectively controlling each heating means, forced air-circulating means connected to one end of said open ended structure for air discharge to all passages, and a plurality of ducts connected to the other end of said open ended structure, each duct being connected to receive air from a selected number of air passages.

References Cited in the file of this patent

UNITED STATES PATENTS

| | | |
|---|---|---|
| 1,217,229 | Smith | Feb. 27, 1917 |
| 1,708,580 | Kerlaouezo et al. | Apr. 9, 1929 |
| 2,023,622 | Textorius et al. | Dec. 10, 1935 |
| 2,252,064 | Cornell | Aug. 12, 1941 |
| 2,543,583 | Mattox | Feb. 27, 1951 |
| 2,839,659 | Cotts et al. | June 17, 1958 |